(12) United States Patent
Ooyama

(10) Patent No.: US 6,677,693 B2
(45) Date of Patent: Jan. 13, 2004

(54) MOTOR

(75) Inventor: Mitsuaki Ooyama, Toyohashi (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 13 days.

(21) Appl. No.: 10/072,143

(22) Filed: Feb. 6, 2002

(65) Prior Publication Data

US 2002/0105246 A1 Aug. 8, 2002

(30) Foreign Application Priority Data

Jan. 21, 2001 (JP) ............................ 2001-383455
Feb. 6, 2001 (JP) ............................ 2001-029855

(51) Int. Cl.⁷ .................................................. H02K 39/38
(52) U.S. Cl. ......................... 310/239; 310/233; 310/51
(58) Field of Search .................. 310/51, 239, 233, 310/98, 99, 116, 117, 118, 89

(56) References Cited

U.S. PATENT DOCUMENTS

| | | | | |
|---|---|---|---|---|
| 4,851,730 A | * | 7/1989 | Fushiya et al. | ............. 310/249 |
| 5,243,247 A | * | 9/1993 | Schmidt | ..................... 310/239 |
| 6,104,110 A | * | 8/2000 | Uchida et al. | ................. 310/51 |
| 6,300,696 B1 | * | 10/2001 | Wong | ....................... 310/68 R |
| 6,452,297 B2 | * | 9/2002 | Yamamoto et al. | ............ 310/89 |
| 2002/0030414 A1 | * | 3/2002 | Mizutani et al. | .............. 310/51 |

FOREIGN PATENT DOCUMENTS

| | | |
|---|---|---|
| JP | 1-107561 | 9/1989 |
| JP | 10-356429 | 12/1998 |

* cited by examiner

*Primary Examiner*—Thanh Lam
(74) *Attorney, Agent, or Firm*—Sheridan Ross PC

(57) ABSTRACT

The motor has a motor housing. The motor housing supports therein rotatably an armature having a rotating shaft and a commutator. Brushes are brought into friction contact with the commutator. The brushes have brush holders for holding them respectively. The brush holders are attached to a base plate having a first side and a second side. A plurality of electric parts are mounted on the base plate. These electric parts are allocated to the first side and the second side of the base plate.

22 Claims, 15 Drawing Sheets

MOTOR

BACKGROUND OF THE INVENTION

The present invention relates to a motor having in its housing electric parts including choke coils for preventing electromagnetic noise and a circuit breaker serving as a circuit protector.

There are some conventional direct current motors having electric parts including choke coils for preventing electromagnetic noise and circuit breakers serving as circuit protectors in their housings, respectively.

When such motors are used, for example, in vehicles, they are inevitably demanded to come in small sizes, since vehicles have small spaces for them. Therefore, it is essential to arrange the electric parts including choke coils and a circuit breaker efficiently in the motor housing so as to achieve downsizing of such a motor or an apparatus employing the motor as a drive source.

BRIEF SUMMARY OF THE INVENTION

The present invention was accomplished in order to solve the problem described above, and it is an object of the invention to provide a downsizable motor.

With a view to attaining the above object, the motor according to the present invention has the following constitution. The motor has a motor housing. The motor housing supports rotatably an armature having a rotating shaft and a commutator. Brushes are brought into friction contact with the commutator. The motor has brush holders for holding the brushes. The brush holders are attached to a base plate having a first side and a second side. A plurality of electric parts is mounted on the base plate. These electric parts are allocated to the first side and the second side.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
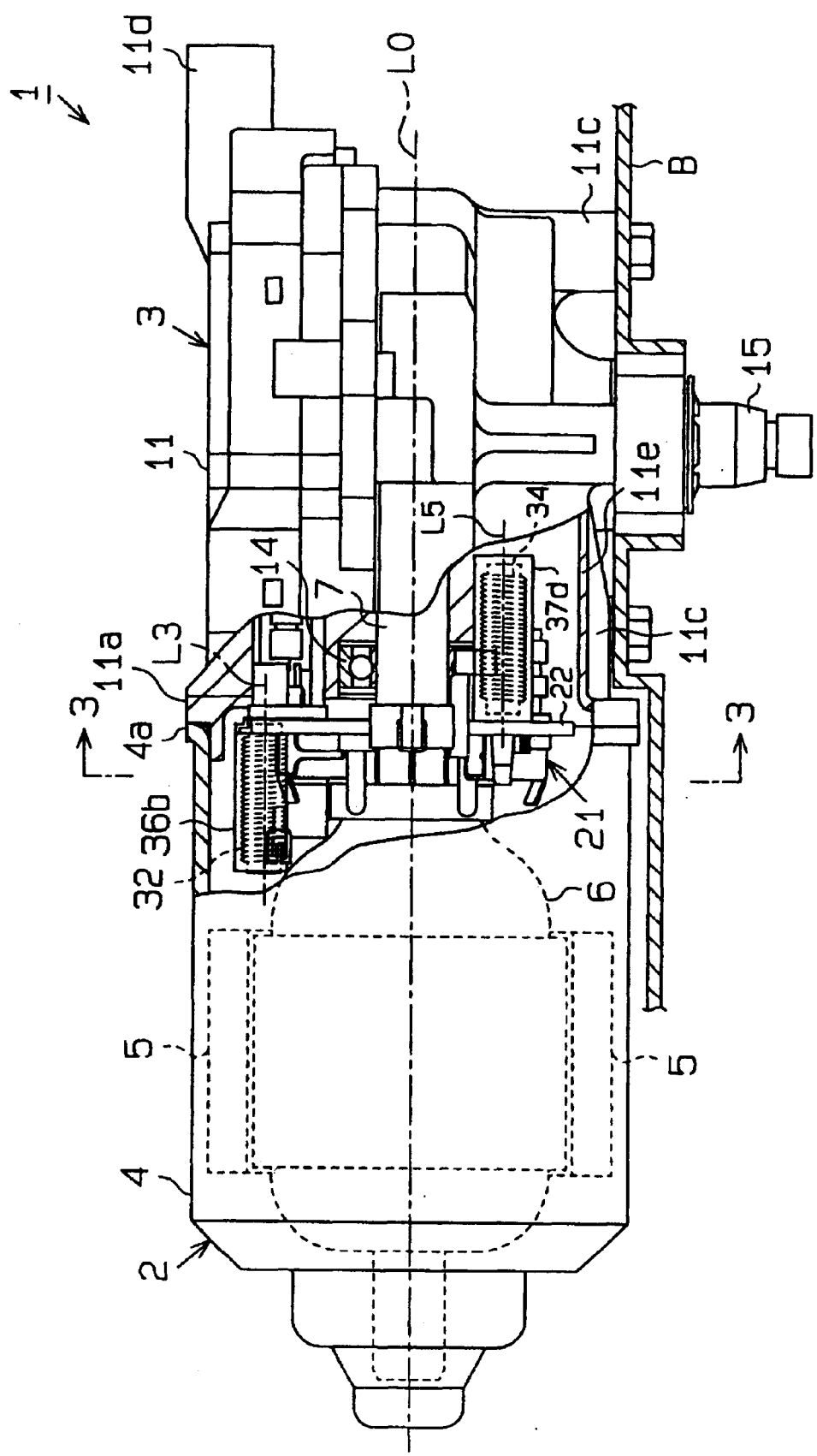
FIG. 1 is a plan view of a wiper motor according to a first embodiment of the present invention.

The present invention will be described below by way of an embodiment referring to the drawings.

Figure 2:
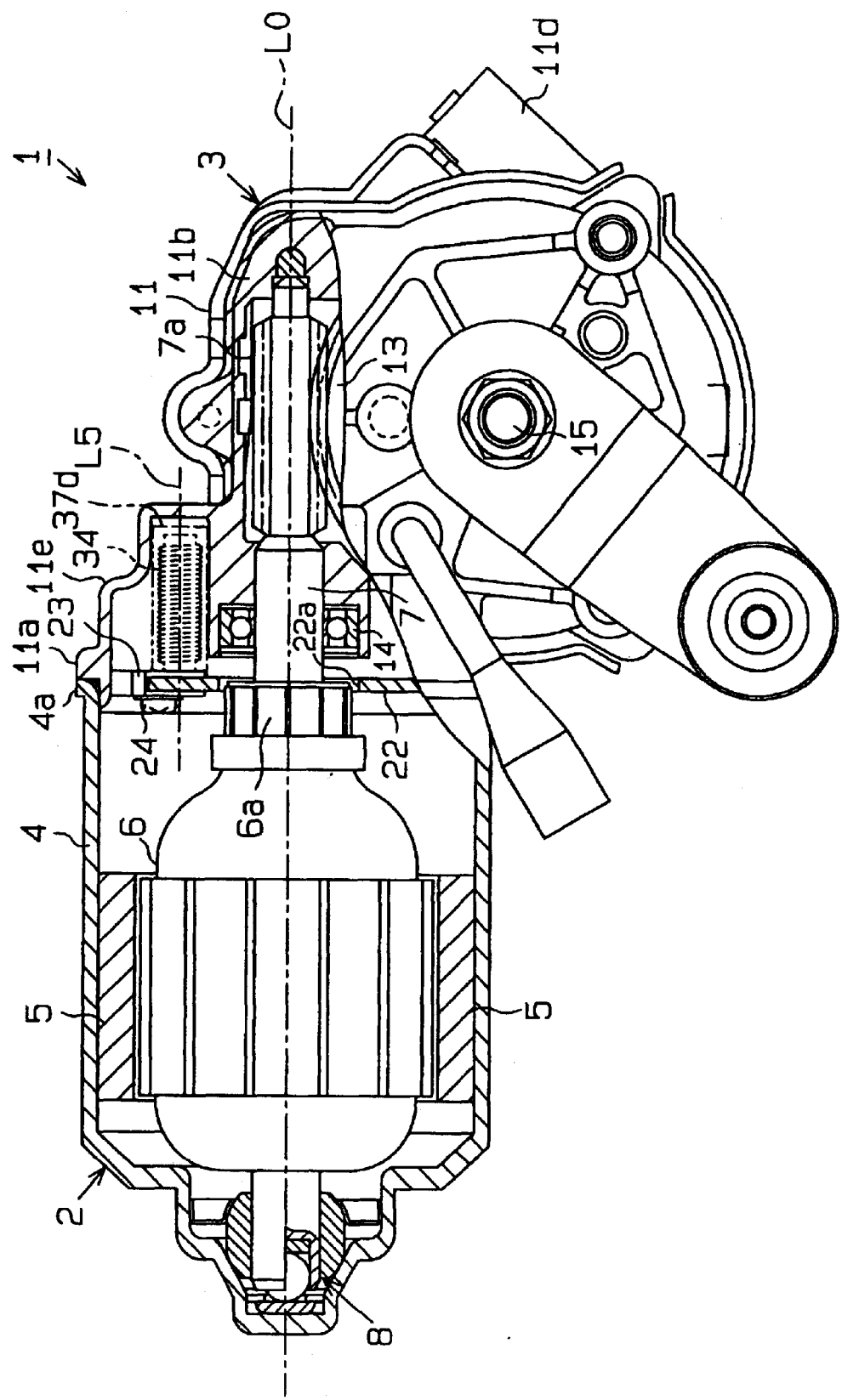
FIG. 2 is a front view of the wiper motor shown in FIG. 1.

FIGS. 1 and 2 show a wiper motor 1. The wiper motor 1 is used as a drive source of an in-vehicle wiper apparatus for wiping the windshield of a vehicle clouded with raindrops and the like. The wiper motor 1 is composed essentially of a motor section 2 and a decelerating section (decelerating mechanism) 3 for decelerating revolution in the motor section 2.

Figure 3:
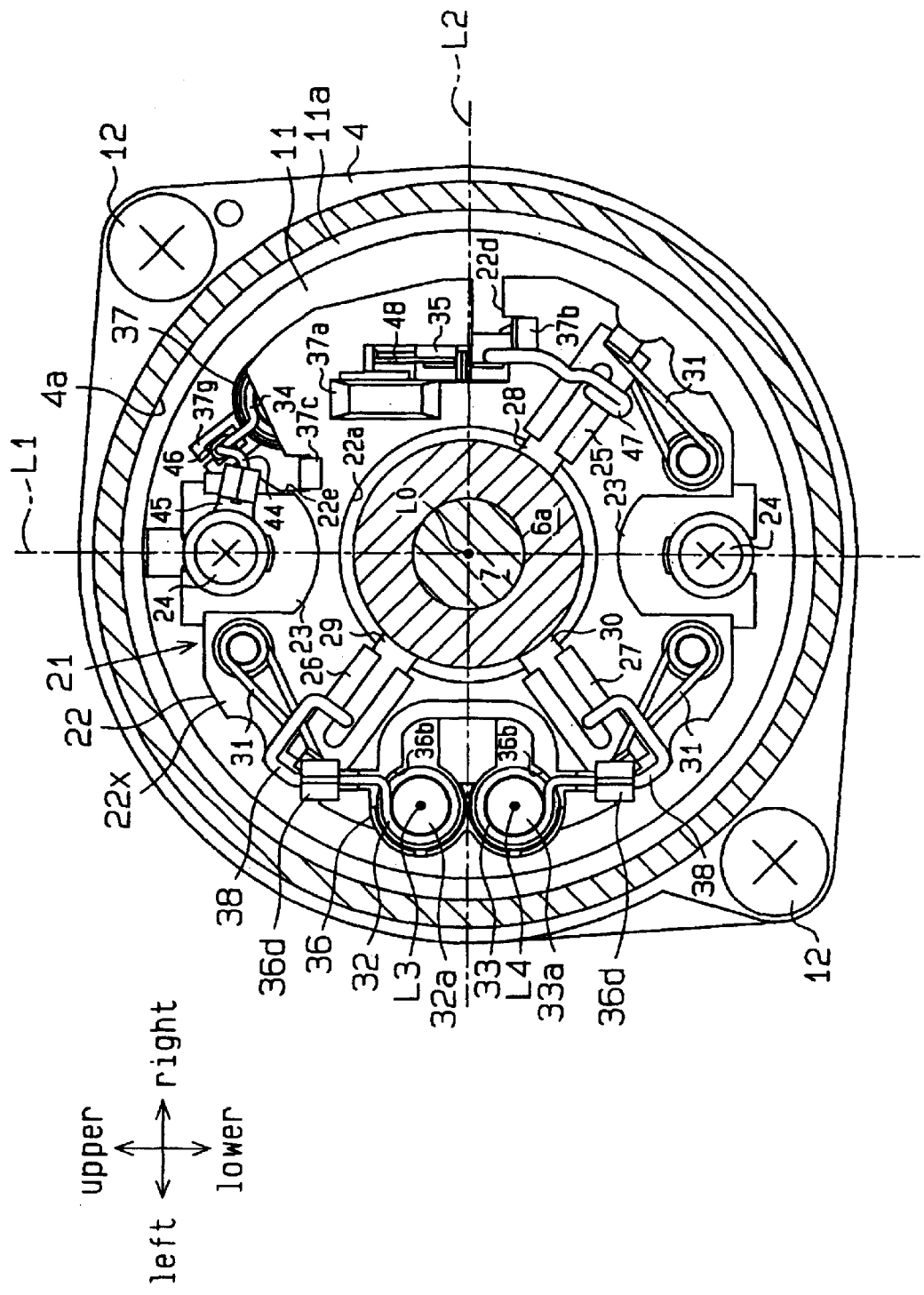
FIG. 3 is a cross-sectional view taken along Line 3—3 in FIG. 1.

In the motor section 2, a yoke housing 4 constituting a motor housing is formed with a conductive metallic material to have a cylindrical shape with a closed bottom. The yoke housing 4 has a plurality of magnet pieces 5 fixed onto the inner circumferential surface thereof, and an armature 6 is rotatably supported in the housing 4 such that it is surrounded by the magnet pieces 5. The yoke housing 4 has in the bottom a bearing 8 for rotatably supporting the proximal end portion of a rotating shaft 7 of the armature 6. A gear housing 11 constituting the motor housing for the decelerating section 3 is fixed with screws 12 to the open end 4a of the yoke housing 4, as shown in FIG. 3, such that the gear housing 11 covers the rotating shaft 7 protruding from the yoke housing 4.

As shown in FIG. 2, in the decelerating section 3, the gear housing 11 is made of a metallic material such as an aluminum alloy and has an open end 11a having substantially the same profile as that of the open end 4a of the yoke housing 4. The gear housing 11 can admit the distal end portion of the rotating shaft 7 and a worm wheel 13. The gear housing 11 contains a bearing 14 fixed thereto and a bearing portion 11b formed therein. The bearing 14 and the bearing portion 11b rotatably support the middle portion and the distal end portion of the rotating shaft 7, respectively. The rotating shaft 7 has a worm 7a formed thereon between the bearing 14 and the bearing portion 11b. The worm 7a is meshed with the worm wheel 13. An output shaft 15 is connected to the worm wheel 13 to be rotatable integrally therewith. The output shaft 15 is oriented perpendicular to the rotating shaft 7. The output shaft 15 is rotated by the rotation of the rotating shaft 7.

Here, the gear housing 11 is attached to a bracket B of a wiper apparatus (not shown) through a bracket mounting portion 11c provided on the output shaft side. The output shaft 15 is operationally connected to a wiper arm through a link mechanism of the wiper apparatus (not shown). The wiper arm carries out a predetermined wiping action under rotation of the output shaft 15.

Figure 4:
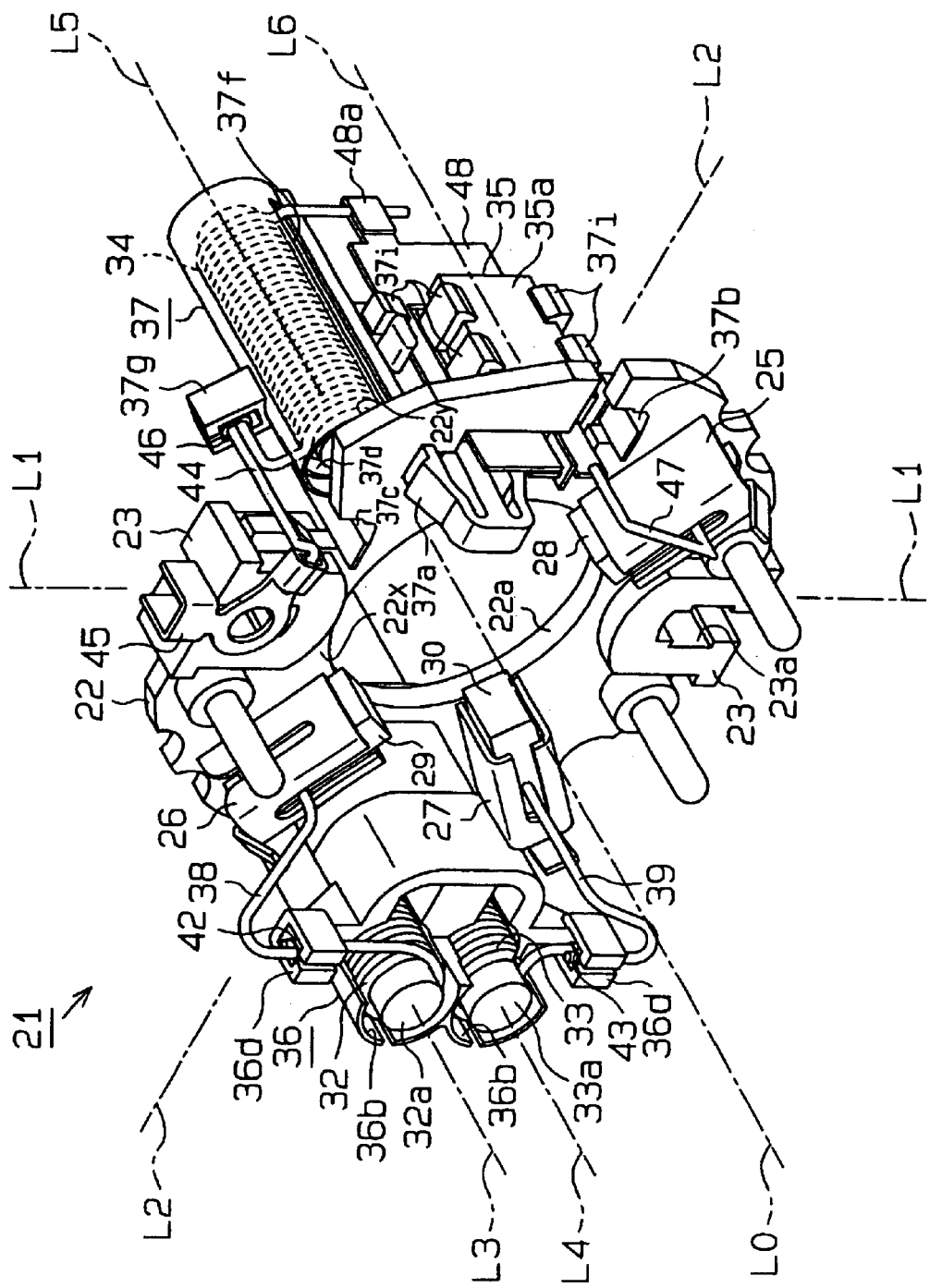
FIG. 4 is a perspective view of a brush device of the wiper motor shown in FIG. 1.
Figure 5:
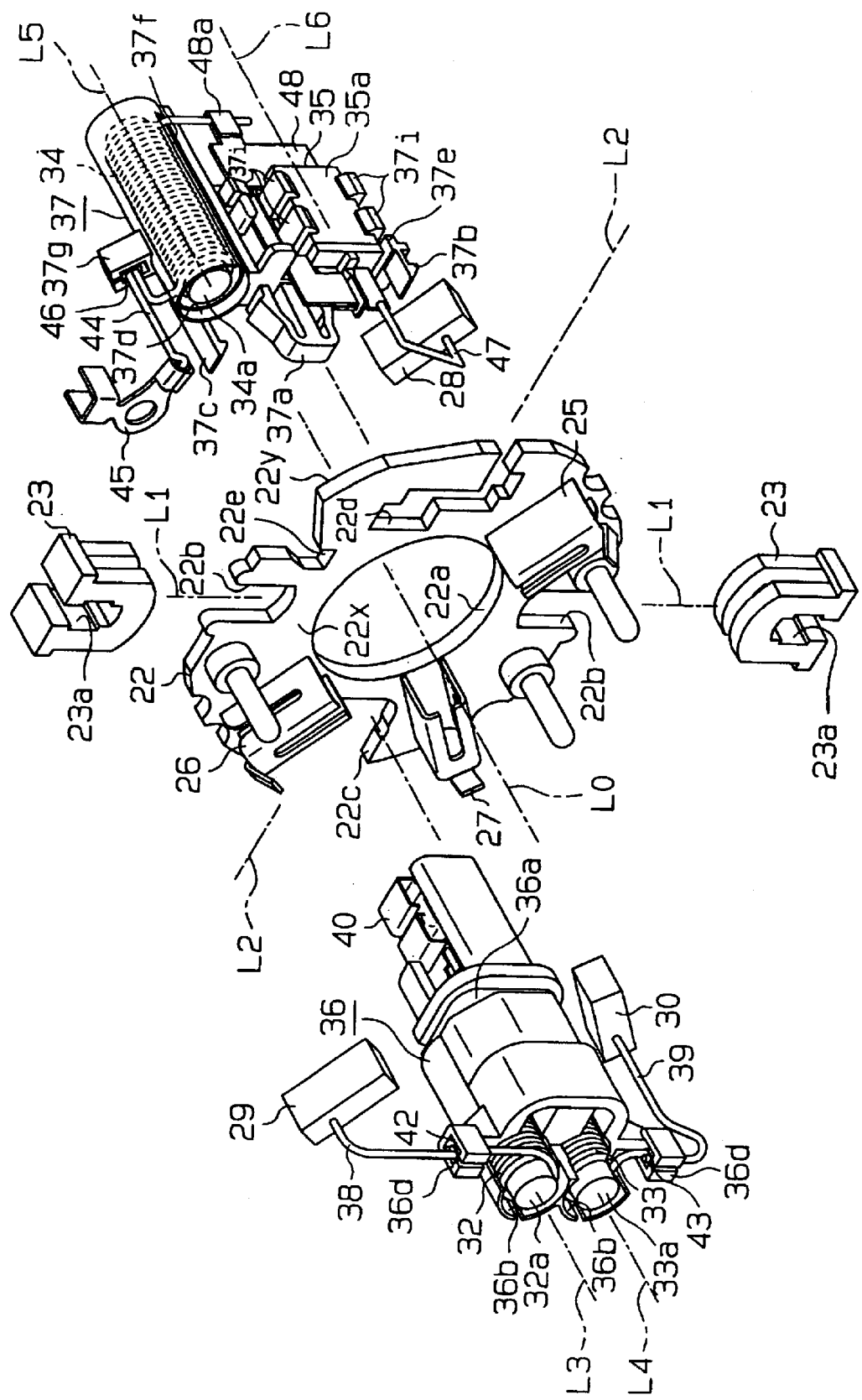
FIG. 5 is an exploded perspective view of the brush device shown in FIG. 4.

A brush device 21, which is a constituent of the motor section 2, is fixed to the open end 11a of the gear housing 11. As shown in FIGS. 4 and 5, the brush device 21 is provided with a substantially annular insulating base plate 22. The insulating base plate 22 has an insertion hole 22a defined at the center, to which the rotating shaft 7 is to be inserted. The insulating base plate 22 has a pair of notches 22b formed by cutting the peripheral edge thereof so that they locate on each side of the insertion hole 22a in alignment with the vertical central line L1 passing the center of the insertion hole 22a (axis L0 of the rotating shaft 7), as shown in FIG. 5. A rubber cushion 23 is fitted in each notch 22b. A screw inserting hole 23a is defined at the center of each rubber cushion 23, and a screw 24 is inserted to the screw inserting hole 23a, as shown in FIG. 3. The screws 24 are driven into the gear housing 11 to fix the insulating base plate 22, or the brush device 21, to the gear housing 11 through the rubber cushions 23. Thus, vibrations to be generated when brushes 28 to 30 are brought into friction contact with the surface of the commutator 6a are adapted to be damped by the rubber cushions 23.

Meanwhile, as shown in FIGS. 3 to 5, a common brush holder 25 is fixed to the insulating base plate 22 on a first plane 22x opposing the yoke housing 4 and between the vertical central line L1 and the horizontal central line L2 (on the lower right section in FIG. 3). The horizontal central line L2 intersects orthogonally to the vertical central line L1 and passes the center of the insertion hole 22a.

A low-speed brush holder 26 is fixed to the first plane 22x to oppose the common brush holder 25 across the insertion hole (on the upper left section in FIG. 3). Further, a high-speed brush holder 27 is fixed to the first plane 22x (the first side of the base plate) at such a position that the brush holders 27 and 26 may form a substantially symmetric arrangement with respect to the horizontal central line L2 (on the lower left section in FIG. 3). The high-speed brush holder 27 is disposed at a predetermined angular interval with respect to the low-speed brush holder 26.

The common, low-speed and high-speed brush holders 25 to 27 hold the common, low-speed and high-speed brushes 28 to 30, respectively. Torsion coiled springs 31 are provided in the vicinities of the brush holders 25 to 27, respectively, as shown in FIG. 3. The torsion coiled springs 31 are provided so as to urge the brushes 28 to 30 toward the commutator 6a fixed to the rotating shaft 7.

A plurality of choke coils 32 to 34 for preventing electromagnetic noise and a circuit breaker 35 as a circuit protector are integrated into the brush device 21. The first and second choke coils 32 and 33 each have a substantially cylindrical shape, and cores 32a and 33a are fixed at the centers thereof, respectively. The first and second choke coils 32 and 33 are provided for the low-speed brush 29 and high-speed brush 30, respectively, and are incorporated into a resinous first part holder 36 shown in FIG. 6. Meanwhile, the third choke coil 34 also has a substantially cylindrical shape, and a core 34a is fixed at the center thereof. The third choke coil 34 is provided for the common brush 28 and is incorporated to a resinous second part holder 37 shown in FIG. 7 together with the substantially square circuit breaker 35. The first and second part holders 36 and 37 are integrated into one unit to improve assembling properties to the insulating base plate 22.

Figure 6:
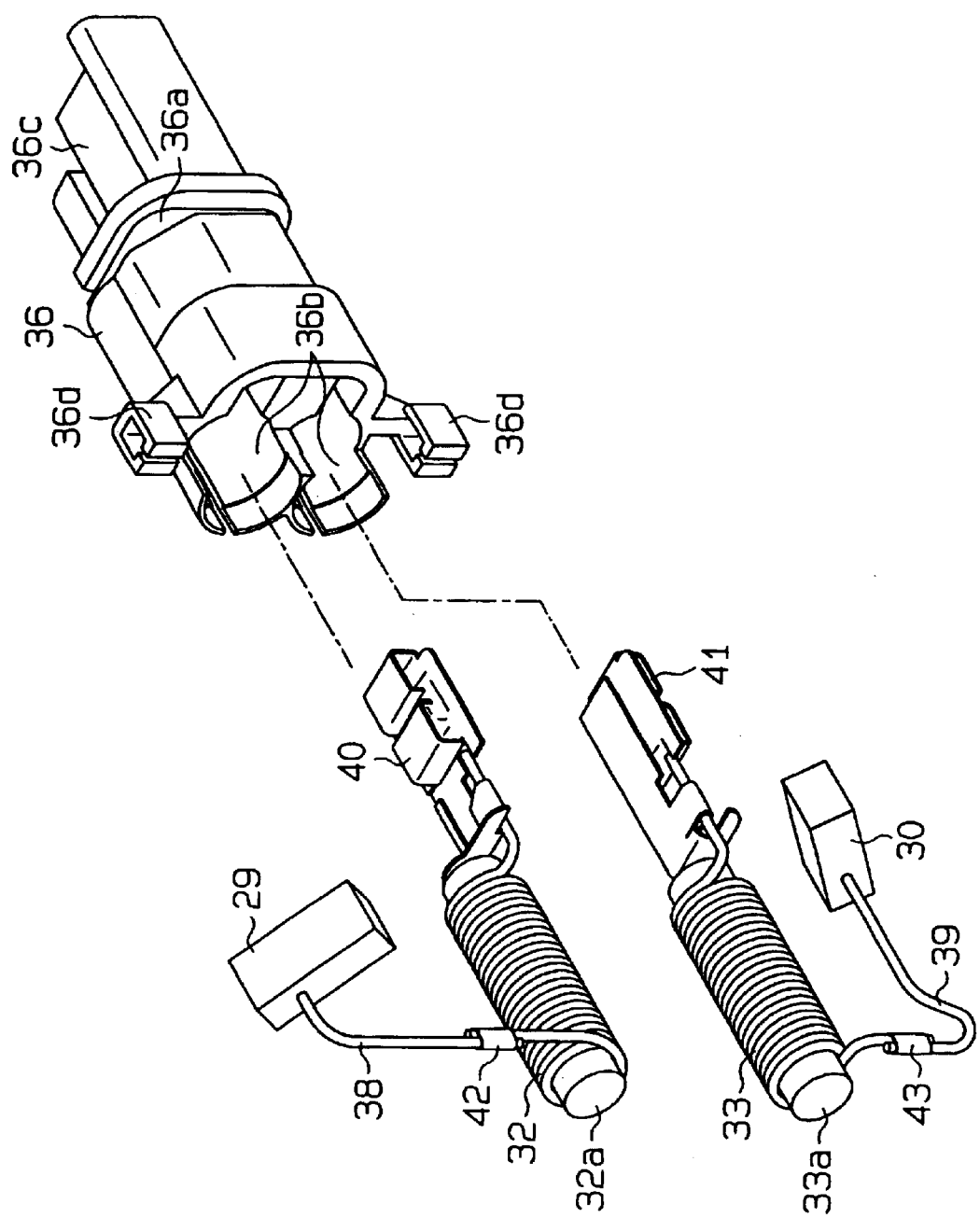
FIG. 6 is an exploded perspective view of a first part holder in the brush device shown in FIG. 4.

The first part holder 36 is located on the left side of the vertical central line L1 of the insulating base plate 22 and between the low-speed brush holder 26 and the high-speed brush holder 27 in alignment with the horizontal central line L2, as shown in FIGS. 3 to 5. More specifically, a notch 22c is formed on the left side of the horizontal central line L2 of the base plate 22 to extend from the peripheral edge thereof radially inward, as shown in FIG. 5. Meanwhile, the first part holder 36 has on the outer circumferential surface a fitting groove 36a to be fitted to the notch 22c, as shown in FIGS. 5 and 6. Thus, the first part holder 36 can be removably mounted onto the insulating base plate 22 by fitting the fitting groove 36a to the notch 22c.

Further, the first part holder 36 is provided with a pair of substantially cylindrical coil holding portions 36b and a pair of terminal receiving portions 36c. The coil holding portions 36b extend along the axis L0 of the rotating shaft 7 on the first plane 22x opposing the yoke housing 4, and the first and second choke coils 32 and 33 are inserted to the associated coil holding portions 36b, respectively. The pair of coil holding portions 36b are juxtaposed to each other as independent parts along the vertical central line L1 being intervened by the horizontal central line L2. The terminal receiving portions 36c communicate with the coil holding portions 36b respectively and extend along the axis L0 to a second plane 22y opposing the gear housing 11 (the second side of the base plate 22).

The choke coils 32 and 33 are connected each at one end to the low-speed brush 29 and to the high-speed brush 30 through pigtails 38 and 39, respectively, and female connecting terminals 40 and 41 are fixed integrally to the other ends of the choke coils 32 and 33, respectively, by means of fusing. It should be noted here that, when the brush device 21 is incorporated into the gear housing 11, the connecting terminals 40 and 41 are connected respectively to male connecting terminals (not shown) provided in the housing 11. The male connecting terminals are electrically connected to terminals (not shown) in a connecting portion 11d provided on the housing 11 shown in FIGS. 1 and 2 so as to receive power supply through connectors (not shown) in the vehicle.

The choke coils 32 and 33 are inserted from the terminals 40 and 41 thereof into the respective coil holding portions 36b, as shown in FIG. 6. Thus, the terminal 40 and 41 and the choke coils 32 and 33 are held in the terminal receiving portions 36c and in the coil holding portions 36b, respectively. The choke coils 32 and 33 are located in the yoke housing 4 such that the axes L3 and L4 thereof are parallel to the axis L0 of the rotating shaft 7.

Further, the choke coils 32 and 33 are held by independent coil holding portions 36b respectively such that the coils 32 and 33 do not substantially expose themselves, thus preventing short-circuiting with other parts. Each coil holding portion 36b has, near the opening thereof, a holding piece 36d for holding joint 42(43) of a tail end of the choke coil 32(33) and the pigtail 38(39), as shown in FIG. 6. The holding pieces 36d hold the joints 42 and 43 respectively to secure insulation from other parts and also prevent unnecessary dislocation of the joints 42 and 43, thus avoiding disconnection at the joints 42 and 43.

Figure 7:
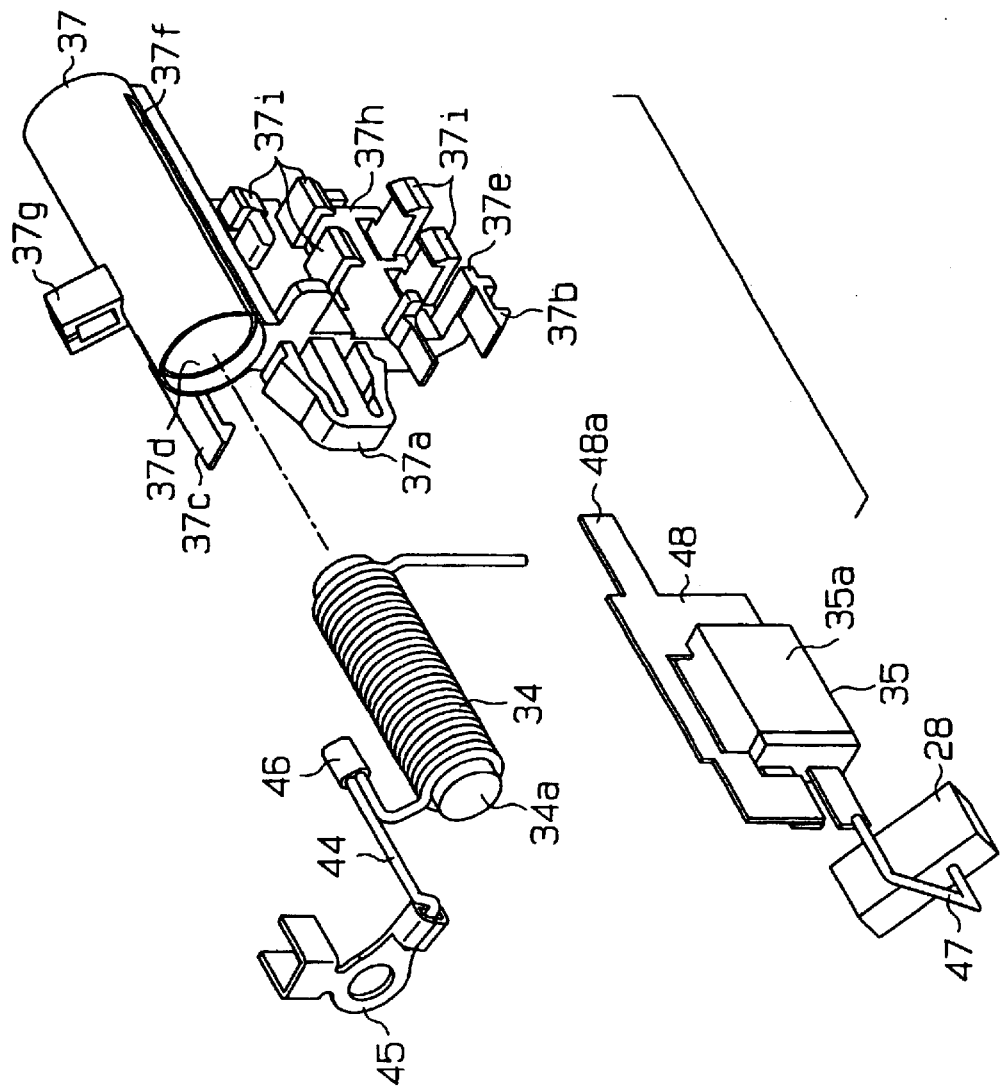
FIG. 7 is an exploded perspective view of a second part holder in the brush device shown in FIG. 4.

Meanwhile, the second part holder 37 is located on the right side of the vertical central line L1 of the insulating base plate 22 on the second plane 22y opposing the gear housing 11 and in alignment with the horizontal central line L2, as shown in FIGS. 3 to 5. In other words, the second part holder 37 is located to oppose the first part holder 36 across the insertion hole 22a. More specifically, a notch 22d is formed to extend inward from the peripheral edge of the base plate 22 on the right side of the vertical central line L1 of the base plate 22 and in alignment with the horizontal central line L2 thereof, as shown in FIG. 5. The notch 22d has in the vicinity thereof another notch 22e forming a pair therewith. Meanwhile, the second part holder 37 has a main engaging piece 37a at the center of the proximal end portion thereof and auxiliary engaging pieces 37b and 37c at both end portions, respectively, as shown in FIGS. 5 and 7. Thus, the second part holder 37 can be removably mounted onto the insulating base plate 22 by engaging the main engaging piece 37a and one auxiliary engaging piece 37b with the notch 22d and by engaging the other auxiliary engaging piece 37c with the notch 22e.

Further, as shown in FIGS. 4, 5 and 7, the second part holder 37 is provided with a cylindrical coil holding portion 37d (to which the choke coil 34 is to be inserted) extended from the proximal end thereof along the axis L0 of the rotating shaft 7, and a breaker holding portion 37e. The breaker holding portion 36e is located parallel to the coil holding portion 37d such that they are intervened by the horizontal central line L2. That is, the coil holding portion 37d is located above the horizontal central line L2, whereas the breaker holding portion 37e is located below the horizontal central line L2.

A first tail end of the third choke coil 34 is connected to an earth terminal 45 through a connecting line 44, and a second tail end is bent outward along the radius of the coil 34. The earth terminal 45 is grounded by interposing it between one screw 24 for fixing the insulating base plate 22 (brush device 21) and the rubber cushion 23, as shown in FIG. 3.

The third choke coil 34 is inserted to the coil holding portion 37d and is held thereby, as shown in FIG. 7, before the second part holder 37 is mounted onto the insulating base plate 22. The choke coil 34 is located within the gear housing 11 such that the axis L5 of the coil 34 is parallel to the axis L0 of the rotating shaft 7, as shown in FIG. 4. Here, the opening of the coil holding portion 37d is substantially closed by the insulating base plate 22, when the second part holder 37 is attached to the base plate 22. This prevents the choke coil 34 from slipping out from the holding portion 37d. Incidentally, the second tail end of the choke coil 34 is led to the outside of the holding portion 37d through an insertion slit 37f formed in the holding portion 37d along the axis thereof and is connected to the circuit breaker 35.

Further, the third choke coil 34 is held by the coil holding portion 37d such that it does not substantially expose itself, thus preventing short-circuiting with other parts. The coil holding portion 37d has, near the opening thereof, a holding piece 37g for holding a joint 46 of the first tail end of the choke coil 34 and the connecting line 44. The joint 46 held by the holding piece 37g secures insulation from other parts and also prevents unnecessary dislocation of the joint 46 to avoid disconnection at the joint 46.

Meanwhile, the breaker holding portion 37e has on the outer lateral side thereof a fitting face 37h extended parallel to the axis L0 of the rotating shaft 7 and the vertical central line L1, as shown in FIG. 7. The fitting face 37h has five engaging pieces 37i formed thereon, which are arranged along the profile of the circuit breaker 35.

It should be noted here that a first terminal of the circuit breaker 35 is extended toward the insulating base plate 22 and is connected to the common brush 28 through a pigtail 47 and that a second terminal of the circuit breaker 35 has a terminal plate 48 extended to the opposite side of the insulating base plate 22. The terminal plate 48 has a connecting piece 48a, which is connected to the second tail end of the choke coil 34 led out from the coil holding portion 37d.

The thus constituted circuit breaker 35 is engaged with the engaging pieces 37i and is removably attached to the fitting face 37h, as shown in FIG. 7. The circuit breaker 35 is located within the gear housing 11 such that the longitudinal axis L6 of the planar portion 35a is parallel to the axis L0 of the rotating shaft 7, as shown in FIGS. 4 and 5. Here, the circuit breaker 35 is located to oppose the armature 6 across the insulating base plate 22. In other words, heat from the armature 6, which is a heat generating element, can be shut off by the insulating base plate 22 by disposing the circuit breaker 35 on the second side (22y) of the base plate 22 to be away from the armature 6, reducing transmission of heat to the breaker 35. Thus, even if the circuit breaker has properties susceptible to ambient temperature, the above arrangement prevents sudden change in the properties of the circuit breaker 35 during operation of the motor 1.

The gear housing 11 has on the open end (11a) side a receiving portion 11a for receiving the coil holding portion 37d, as shown in FIGS. 1 and 2. This receiving portion 11e is formed between the output shaft 15 and the yoke housing 4 and not to have a diameter greater than the outside diameter of the yoke housing 4. Further, the receiving portion 11e is located across the rotating shaft 7 from the worm wheel 13, as shown in FIG. 2, and between the axis L0 of the rotating shaft 7 and the mounting bracket B, as shown in FIG. 1. Although formation of such a receiving portion 11e bulges the gear housing 11, the periphery of the receiving portion 11e is a dead space for in-vehicle elements other than the wiper apparatus having the wiper motor 1 and the mounting bracket B. The motor 1 in this embodiment makes efficient use of the dead space.

Figure 8:
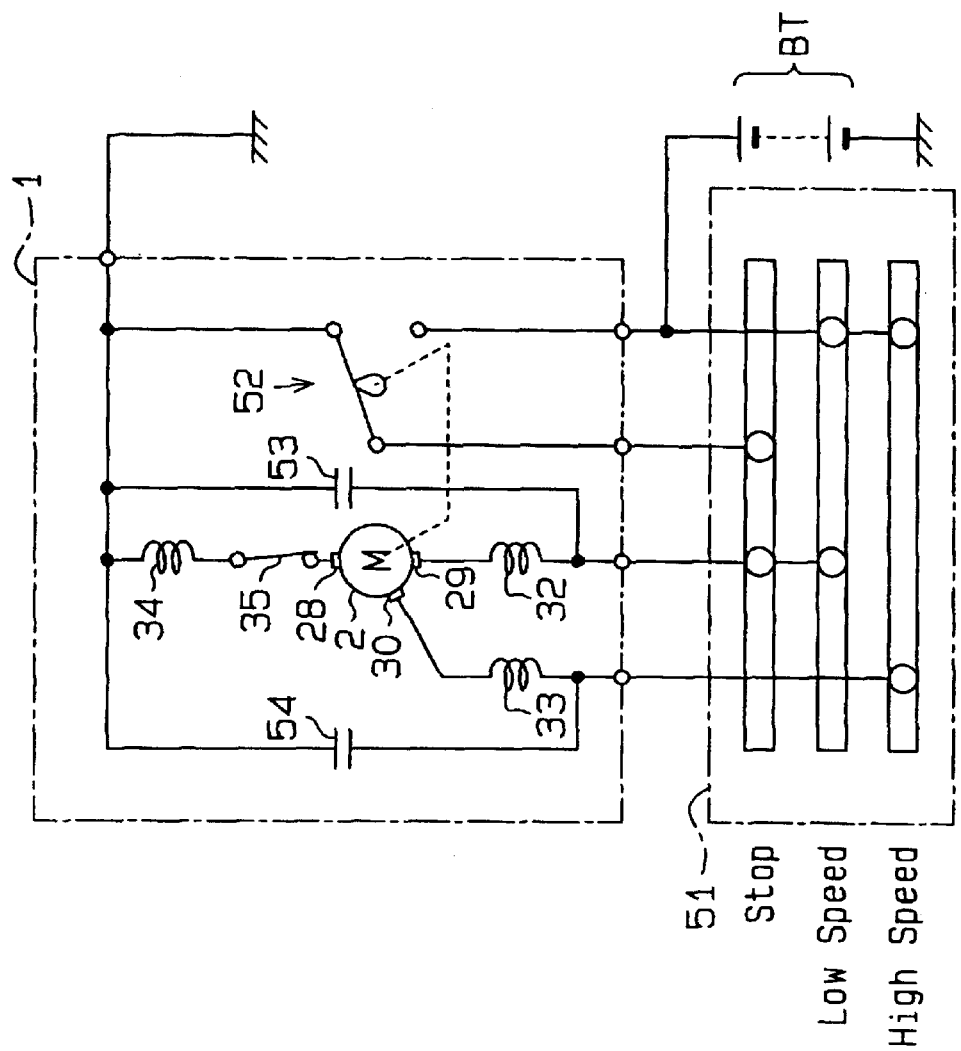
FIG. 8 is an electric circuit diagram of a wiper apparatus.

Next, an electric circuit of the in-vehicle wiper apparatus including the first to third choke coils 32 to 34 and the circuit breaker 35 will be described referring to FIG. 8. As shown in FIG. 8, the first tail end of the first choke coil 32 is connected to the low-speed brush 29. The second tail end of the first choke coil 32 is connected to a battery BT through a wiper switch 51, or it is connected to the battery BT through the wiper switch 51 and a cam switch 52 or is grounded. The first tail end of the second choke coil 33 is connected to the high-speed brush 30, and the second tail end thereof is connected to the battery BT through the wiper switch 51, or it is connected to the battery BT through the wiper switch 51 and the cam switch 52 or is grounded. The first tail end of the third choke coil 34 is grounded, and the second tail end thereof is connected to the common brush 28 through the circuit breaker 35. Capacitors 53 and 54 are connected to the first tail ends (battery BT side) of the first and second choke coils 32 and 33 respectively and to the first tail end (ground side) of the third choke coil 34. The capacitors 53 and 54, which are not illustrated, are located at predetermined positions in the gear housing 11.

The first to third choke coils 32 to 34 and the capacitors 53 and 54 prevent generation of electromagnetic noise between the brushes 28 to 30 and the commutator 6a, whereas the circuit breaker 35 protects the circuit for supplying power to the motor 1 so that the motor 1 may not be burnt by overcurrent.

Characteristics of the above embodiment will be described below.

(1) The choke coils 32 to 34 and the circuit breaker 35 are positioned by the part holders 36 and 37 and are prevented from interfering with one another, as well as, with other motor constituents. Thus, even if these electric parts (choke coils 32 to 34 and the circuit breaker 35) are arranged in close vicinities, they can secure insulation from one another, leading to downsizing of the motor 1.

(2) In this embodiment, the part holder is divided into two (a plurality of) part holders, i.e., the first part holder 36 and the second part holder 37. This constitution can easily avoid interference among motor constituents compared with the case where only one part holder is used and contributes to downsizing of the motor 1.

(3) The choke coils 32, 33 and 34 are arranged such that their axes L3, L4 and L5 are parallel to the axis L0 of the rotating shaft 7, whereas the circuit breaker 35 is oriented such that the longitudinal axis L6 of the planar portion 35a thereof is parallel to the axis L0 of the rotating shaft 7. Therefore, bulging of the motor 1 in the radial direction outward thereof can be minimized to achieve downsizing of the motor 1.

(4) In this embodiment, the first and second choke coils 32 and 33 are entirely disposed on the side of the insulating base plate 22 opposing the yoke housing 4, whereas the third choke coil 34 and the circuit breaker 35 are entirely disposed on the side of the base plate 22 opposing the gear housing 11. Therefore, in this embodiment, interference among these electric parts can be easily prevented compared with the case where these electric parts are disposed only on one side of the base plate, leading to downsizing of the motor 1. In addition, the weight balance of the rotating shaft 7 in the brush device 21 in the direction of the axis L0 can be improved.

(5) In the brush device 21 of this embodiment, since the electric parts are integrated into units by the part holders 36 and 37, this improves facility of incorporating the choke coils 32 to 34 and the circuit breaker 35 to the insulating base plate 22. Besides, since the part holders 36 and 37 are removably attached to the insulating base plate 22, the part holders 36 and 37 can be attached and detached easily to and from the base plate 22.

(6) In the brush device 21 of this embodiment, the first and second choke coils 32 and 33 (first part holder 36), as well as, the third choke coil 34 and circuit breaker 35 (the second part holder 37) are arranged on the insulating base plate 22 to form substantially symmetry with respect to the vertical central line L1 thereof. These like heavy elements arranged symmetrically on the base plate 22 improve weight balance on the plane of the base plate 22 with respect to the central line L. Since fixing portions to which screws 24 are driven are arranged in alignment with the central line L1, the brush device 21 can be allowed to have a vibration-resistant structure.

(7) The part holders 36 and 37 have holding pieces 36d and 37g integrally formed therein respectively for holding the joints 42 and 43 connecting the coils 32 and 33 and the pigtails 38 and 39, respectively, and for holding the joint 46 connecting the coil 34 and the connecting line 44. Therefore, the joints 42, 43 and 46 can secure insulation from other parts and can also prevent useless dislocation of them, thus avoiding disconnection in these joints 42, 43 and 46.

(8) The gear housing 11 has the receiving portion 11e for receiving the coil holding portion 37d, to be located between the axis L0 of the rotating shaft 7 and the mounting bracket B. Thus, formation of such a receiving portion 11e bulges the gear housing 11. However, the periphery of the receiving portion 11e is a dead space for in-vehicle elements other than the wiper apparatus having the wiper motor 1 and the mounting bracket B. Disposing the receiving portion 11e in such a space can achieve downsizing of other parts of the motor 1, leading to overall downsizing of the wiper apparatus. Further, this receiving portion 11e is formed to have a diameter smaller than the outside diameter of the yoke housing 4, contributing to downsizing of the motor 1 in the radial direction. Further, since the receiving portion 11e is located in the space between the output shaft 15 and the yoke housing 4 along the axis of the rotating shaft 7, the entire device can be downsized compared with the case where the receiving portion 11e is located across the output shaft 15 from the yoke housing 4.

The embodiment of the present invention may be modified as described below.

The capacitors 53 and 54 disposed at predetermined positions in the gear housing 11 in the above embodiment may be adapted to be held by the part holders 36 and 37 like the choke coils 32, 33 and 34 and circuit breaker 35.

The constitution of the brush device 21 and those of the part holders 36 and 37 in the above embodiment may be suitably modified. For example, the insulating base plate 22 and the brush holders 25 to 27 may be formed integrally with a resin material. Further, the constitution of the brush device 21 and those of the part holders 36 and 37 may be modified, for example, as shown in FIGS. 9 to 15.

Figure 9A:
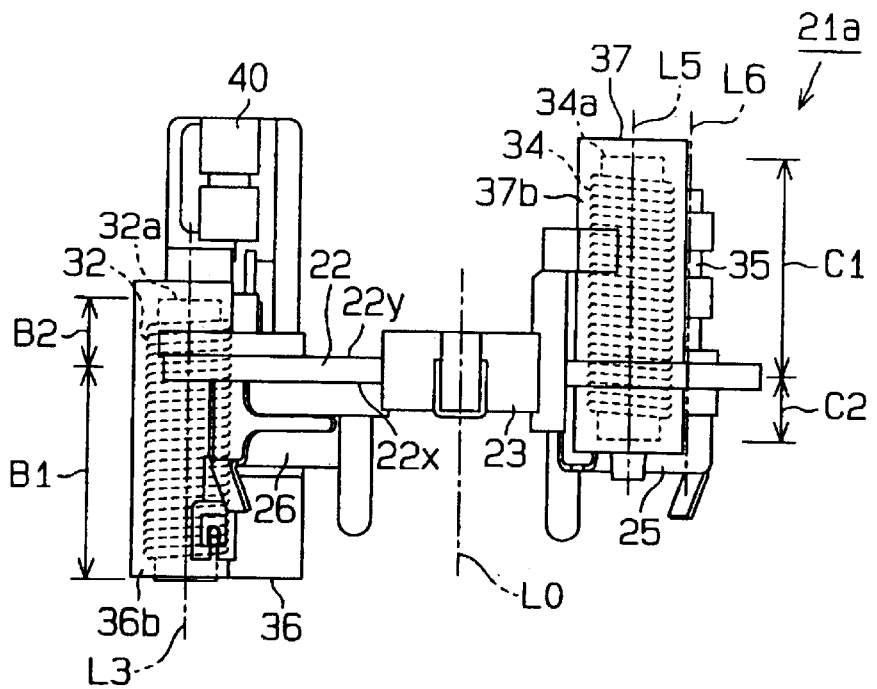
FIG. 9(a) is a plan view of the brush device according to a second embodiment of the present invention.
Figure 9B:
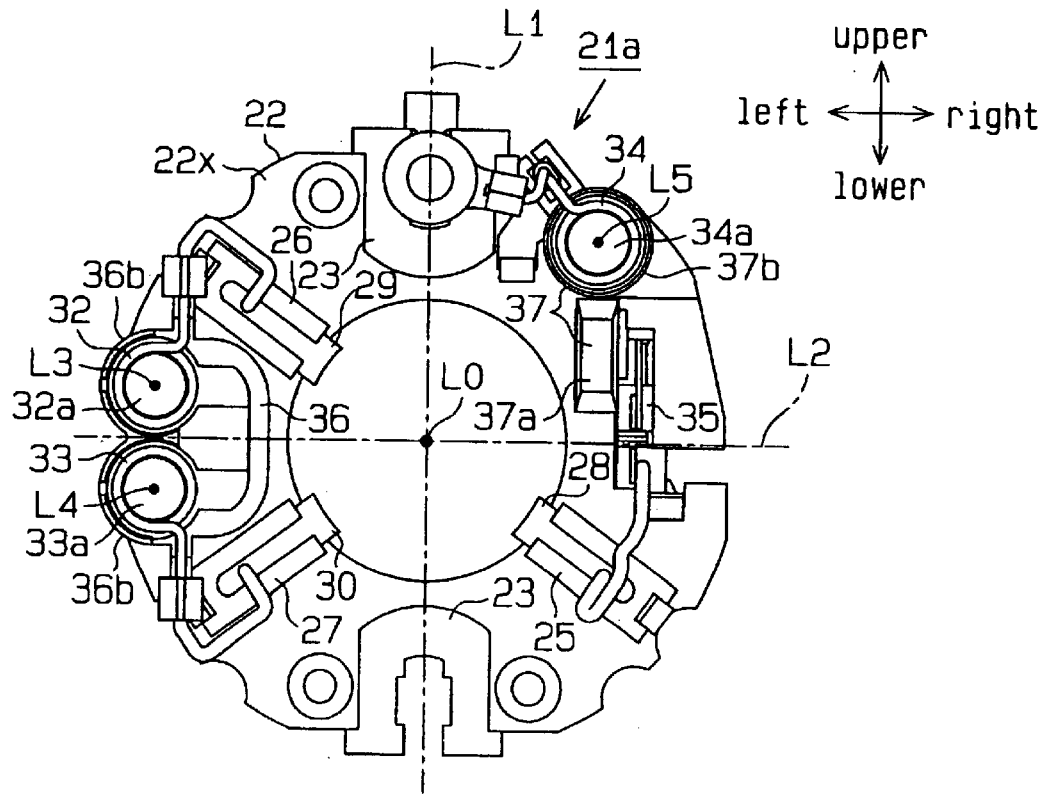
FIG. 9(b) is a side view of the brush device shown in FIG. 9(a)

In a brush device 21a according to a second embodiment of the present invention shown in FIGS. 9(a) and 9(b), the configurations of the first and second brush holders 36 and 37 are slightly modified compared with the first embodiment. More specifically, the choke coils 32 and 33 are each designed to have a length "B1" (from the center of the thickness of the insulating base plate 22 to the distal end of the choke coil opposing the yoke housing 4) and a length "B2" (from the center of the thickness of the base plate 22 to the distal end of the choke coil opposing the gear housing 11). In this case, the length B1 is designed to be much greater than the length B2. Each coil holding portion 36b of the first part holder 36 is formed to cover the length B1 and the length B2.

Meanwhile, the choke coil 34 is designed to have a length "C1" (from the center of the thickness of the insulating base plate 22 to the distal end of the choke coil 34 opposing the gear housing 11) and a length "C2" (from the center of the thickness of the base plate 22 to the distal end of the choke coil 34 opposing the yoke housing 4). In this case, contrary to the choke coils 32 and 33, the length C1 is designed to be much greater than the length C2. The coil holding portion 37d of the second part holder 37 is formed to cover the length C1 and the length C2.

Substantial parts of the first and second choke coils 32 and 33, as well as, the third choke coil 34 and the circuit breaker 35 are arranged on different sides 22x and 22y of the base plate, respectively, as described above, and thus these electric parts, like in the above embodiment, can be easily prevented from interfering with one another compared with the case where these electric parts are arranged only on one side of the base plate, even if the motor 1 is downsized. Further, a plurality of electric parts are allocated on both sides of the base plate 22, interference among them can easily be prevented likewise even if the motor 1 is downsized.

Further, since these electric parts are arranged such that their axes L3 to L6 are parallel to the axis L0 of the rotating shaft 7 like in the above embodiment, the radial dimension of the motor 1 can be minimized. This achieves downsizing of the motor 1. In addition, weight balance of the rotating shaft 7 in the brush device 21a in the direction of the axis L0 can also be improved. These electric parts are arranged to form substantially symmetry with respect to the vertical central line L1 like in the above embodiment so as to balance the pair of choke coils 32 and 33 with the choke coil 34 and circuit breaker 35 on the plane of the insulating base plate 22 with respect to the vertical central line L1. Since the fixing portion to which the screws 24 (not shown in FIG. 9) are to be driven are located in alignment with the line L1, the brush 21a can be allowed to have a vibration-resistant structure.

Figure 10A:
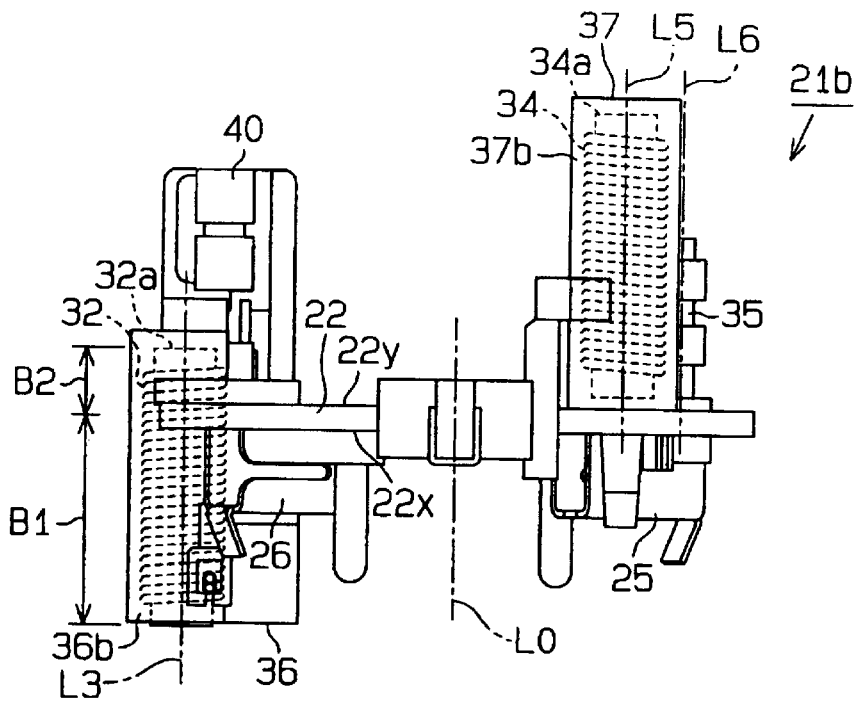
FIG. 10(a) is a plan view of the brush device according to a third embodiment of the present invention.
Figure 10B:
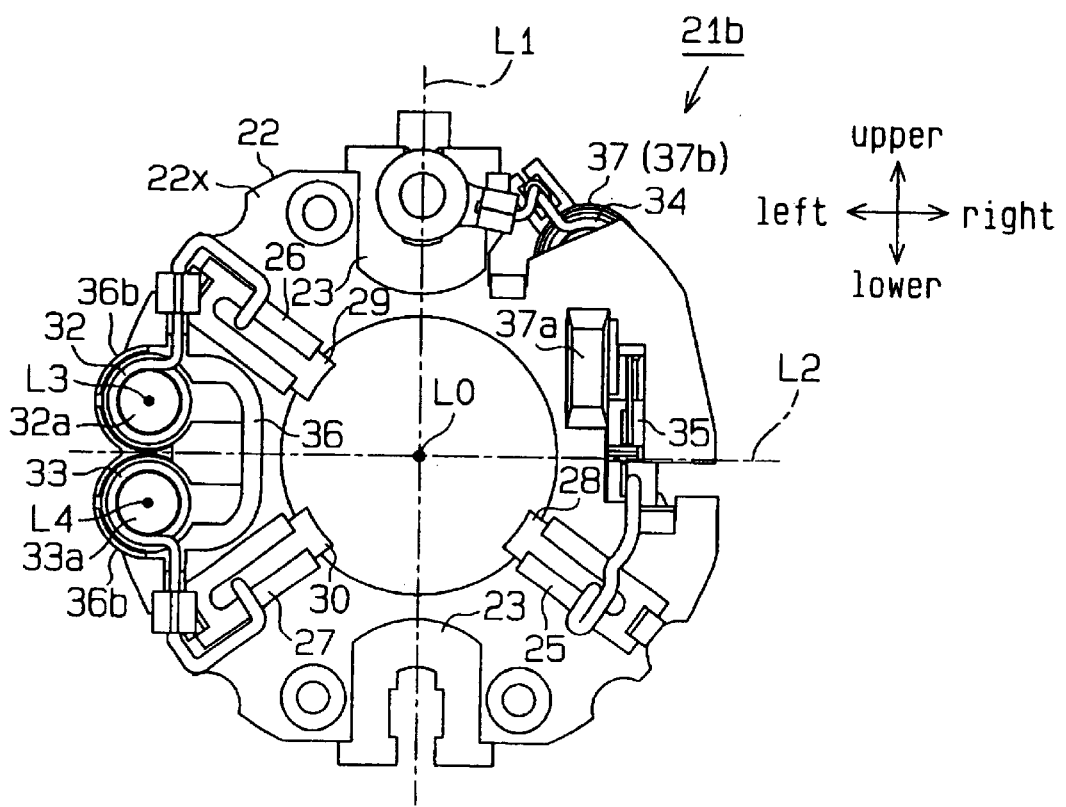
FIG. 10(b) is a side view of the brush device shown in FIG. 10(a)

In a third embodiment of the present invention shown in FIGS. 10(a) and 10(b), the configuration of the first part holder 36 in the above embodiment may be modified like in the second embodiment shown in FIG. 9. More specifically, in the third embodiment, substantial parts of the first and second choke coils 32 and 33 are located on the first side 22x of the base plate 22, whereas the third choke coil 34 and the circuit breaker 35 are entirely located on the second side 22y of the base plate 22. This arrangement can also exhibit like effects as described above.

Figure 11A:
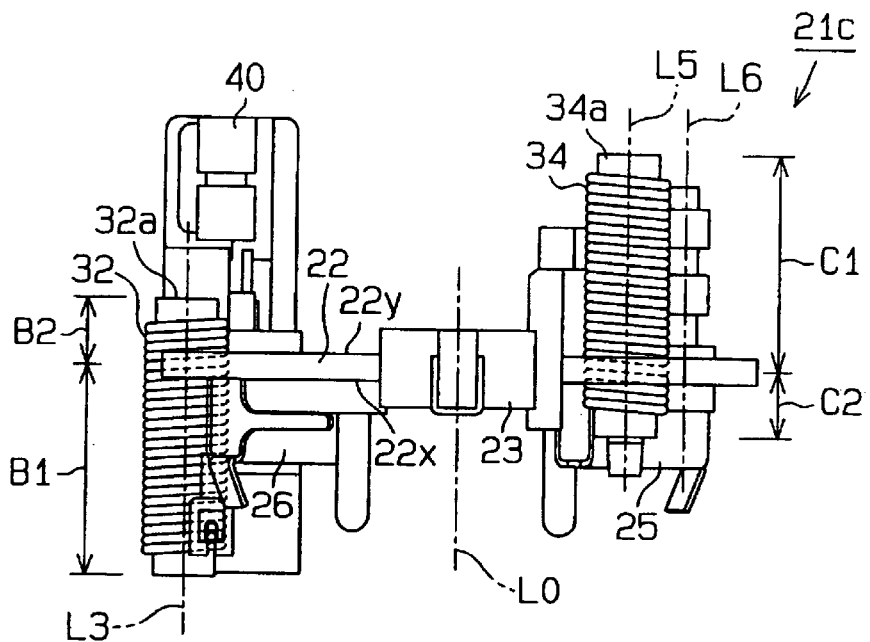
FIG. 11(a) is a plan view of the brush device according to a fourth embodiment of the present invention.
Figure 11B:
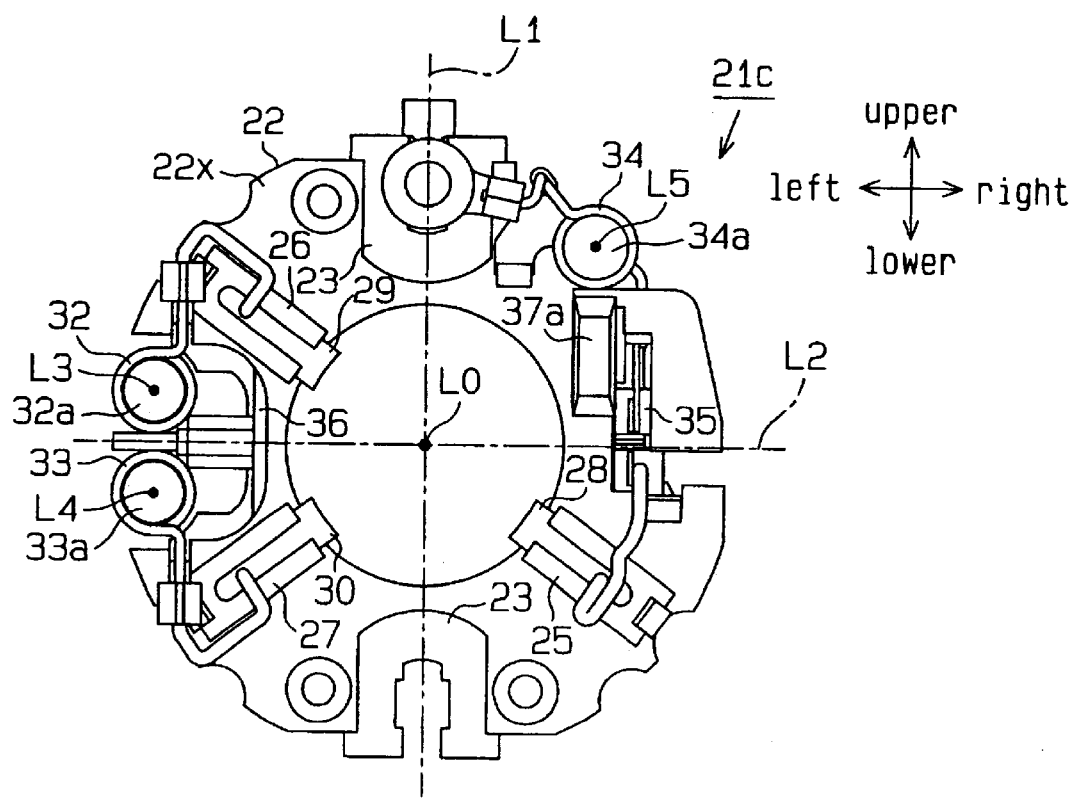
FIG. 11(b) is a side view of the brush device shown in FIG. 11(a)

Meanwhile, a brush device 21c according to a fourth embodiment of the present invention shown in FIGS. 11(a) and 11(b) is different from the second embodiment shown in FIGS. 9(a) and 9(b) in that the coil holding portions 36b and 37d of the first and second part holders 36 and 37 are omitted. Thus, the first to third choke coils 32 to 34 are exposed. In this embodiment, like effects as in the second embodiment can be exhibited.

Figure 12A:
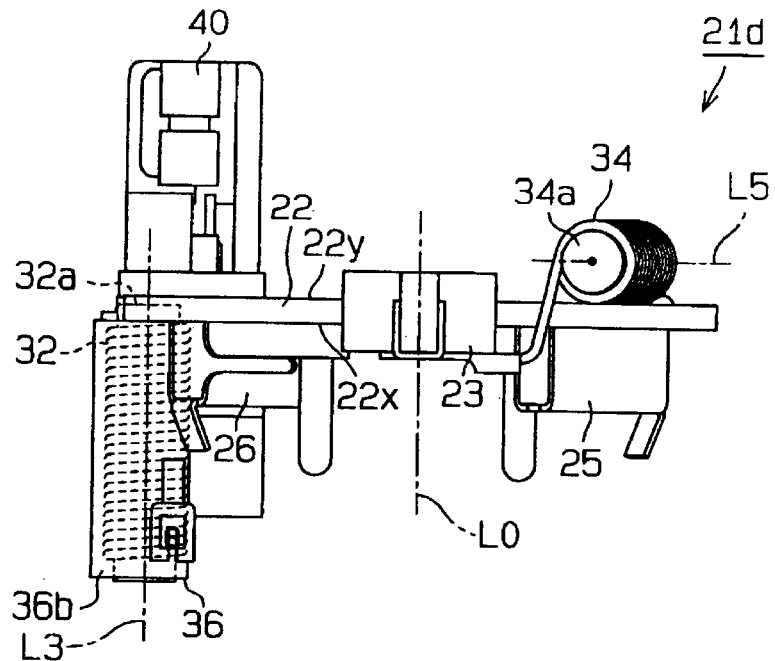
FIG. 12(a) is a plan view of the brush device according to a fifth embodiment of the present invention.
Figure 12B:
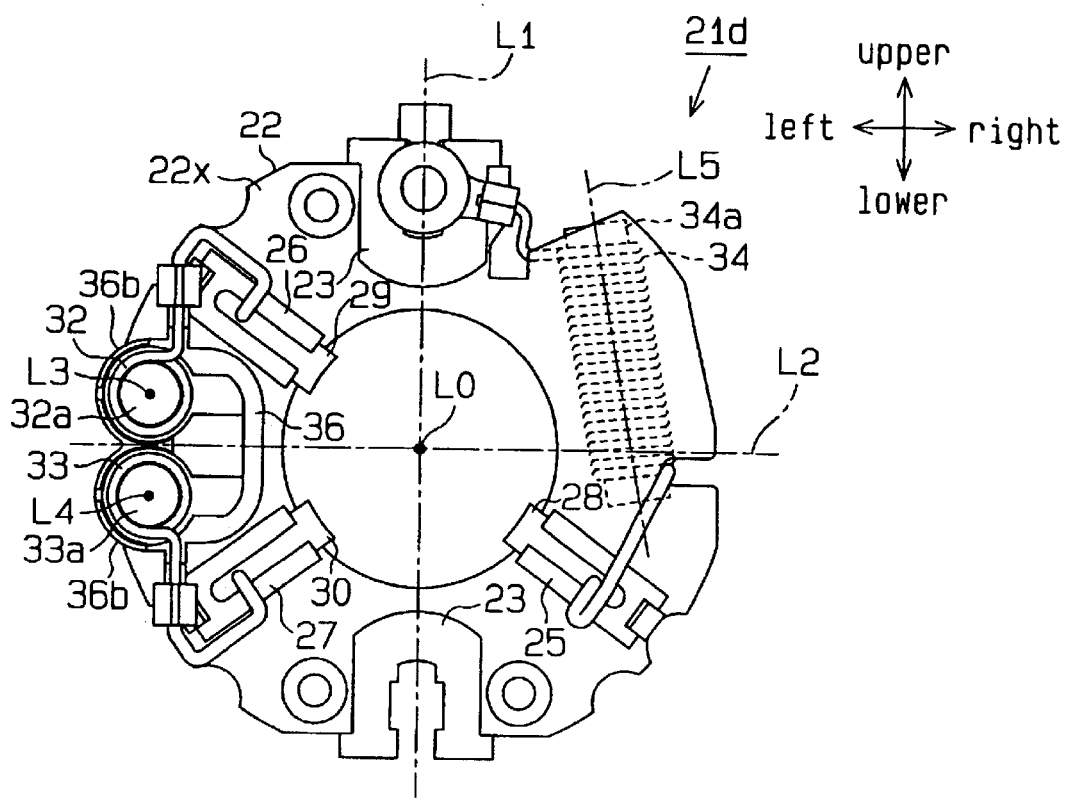
FIG. 12(b) is a side view of the brush device shown in FIG. 12(a)

A brush device 21d according to a fifth embodiment of the present invention shown in FIGS. 12(a) and 12(b) has a like first part holder 36 as in the first embodiment, but the second part holder 37 is omitted. The third choke coil 34 is arranged to be abutted against the second plane 22y of the base plate 22 such that the axis L5 of the coil 34 is parallel to the second plane 22y opposing the gear housing 11. Incidentally, the circuit breaker is not illustrated in FIGS. 12(a) and 12(b).

Even if the first and second choke coils 32 and 33, as well as, the third choke coil 34 are arranged on the first side 22x and on the second side 22y of the base plate 22 respectively in such a manner as described above, the motor 1 can be downsized like in the first embodiment.

Figure 13:
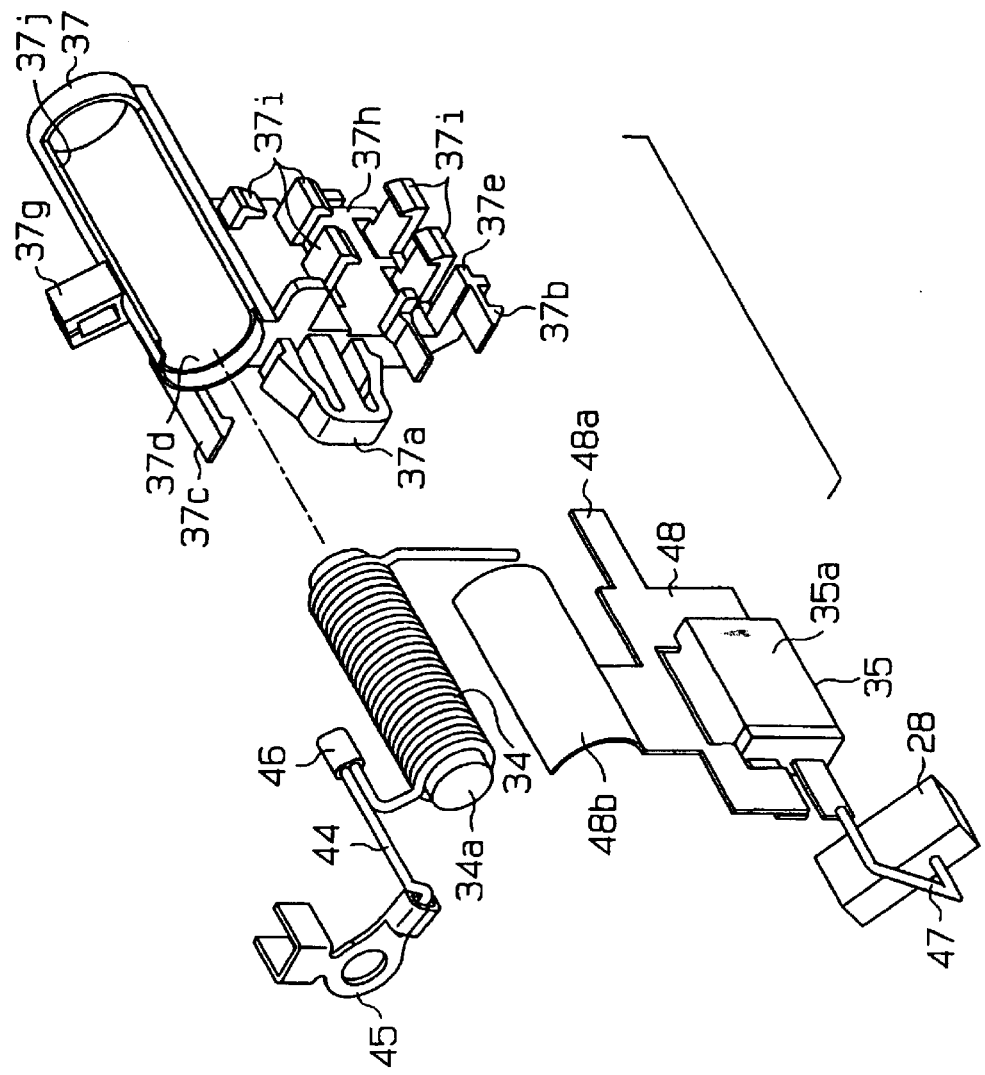
FIG. 13 is an exploded perspective view of the second part holder according to a sixth embodiment of the present invention.
Figure 14:
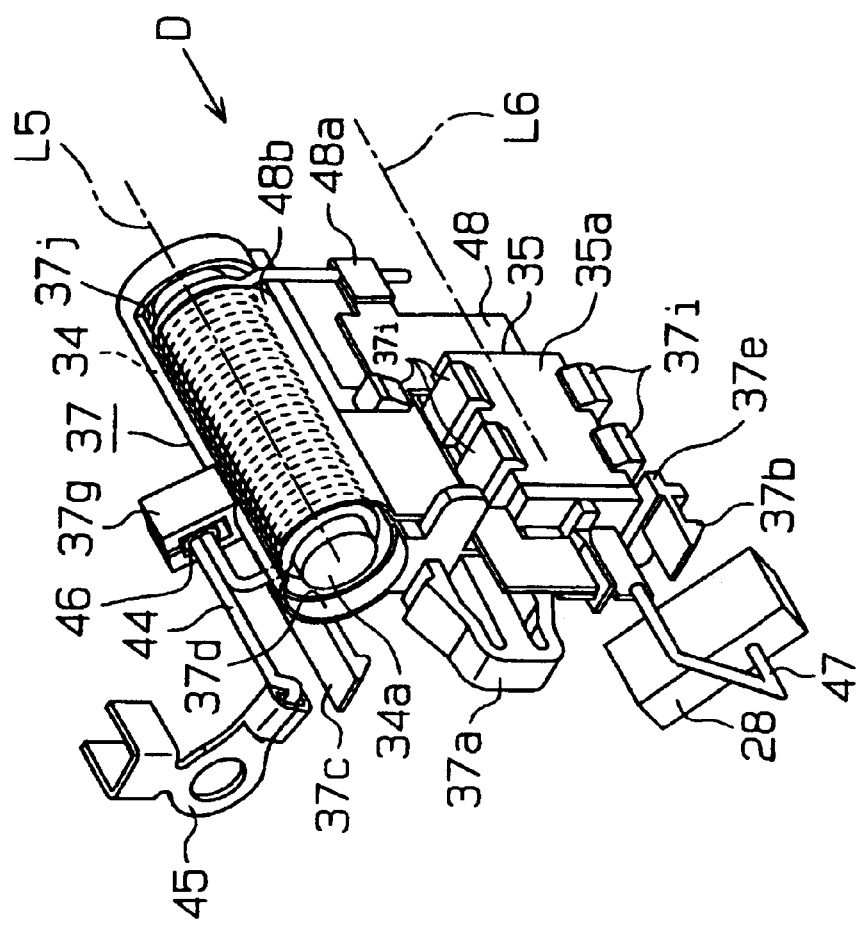
FIG. 14 is a perspective view of the second part holder shown in FIG. 13.
Figure 15A:
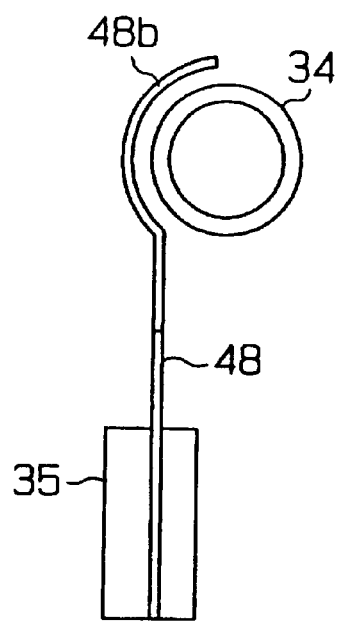
FIGS. 15(a), 15(b), 15(c) and 15(d) are views D in FIG. 14, showing variations of an extended portion (heat-receiving portion).

In a sixth embodiment shown in FIGS. 13 and 14, a notch 37j is formed in the coil holding portion 37d of the second part holder 37 by cutting off substantially a half of the barrel thereof. Meanwhile, the terminal plate 48 combined with the circuit breaker 35 has an extended portion 48b having an arcuate cross section serving as a heat receiving portion. The extended portion 48b has a size substantially the equal to that of the notch 37j defined in the coil holding portion 37d. This extended portion 48b covers substantially a half (½) of the barrel of the choke coil 34, as shown in FIG. 15(a). During operation of the motor 1, the extended portion 48b receives the heat generated proportional to the current flowing through the choke coil 34 and transfers the heat to the circuit breaker 35. The circuit breaker 35 behaves depending on the ambient temperature changed by the heat.

Here, the brush device 21 can be used in wiper motors other than the wiper motor 1 or in motors employed for other apparatuses than the wiper apparatus. In such cases, however, since binding current (overcurrent under binding of the rotating shaft) differs depending on the kind of motor (e.g., motor torque), motors require circuit breakers having properties matching the conditions where they are used.

Figure 15B:
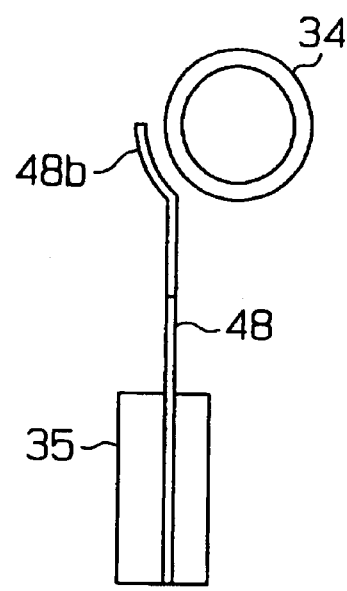
Figure 15C:
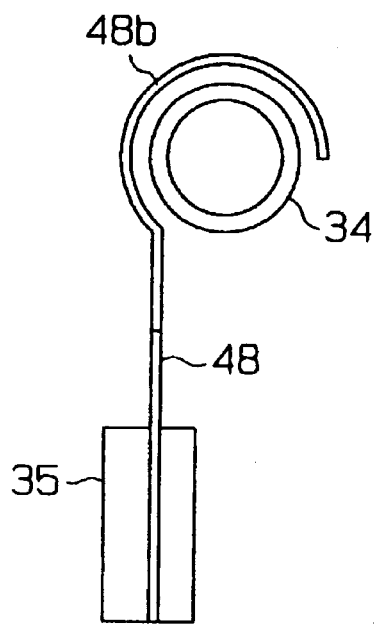
Figure 15D:
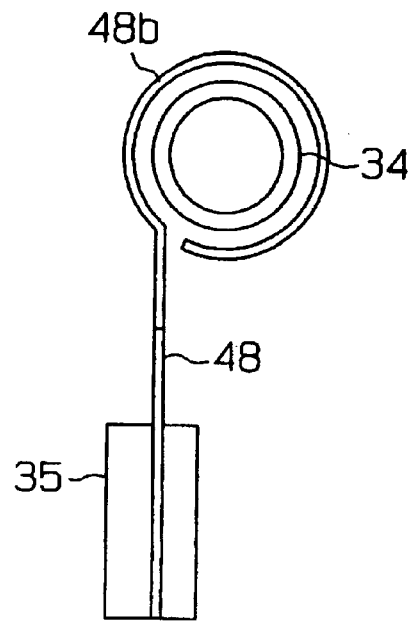

Therefore, in this embodiment, the configuration of the extended portion 48b is suitably modified as shown in FIGS. 15(b) to 15(d). More specifically, the heat receiving surface area of the extended portion 48b is modified, for example, by allowing the extended portion 48b to have a size substantially ¼ as large as the circumferential surface of the choke coil 34, as shown in FIG. 15(b); by allowing the extended portion 48b to have a size substantially ¾ as large as the circumferential surface of the choke coil 34, as shown in FIG. 15(c); or by allowing the extended portion 48b to surround substantially the entire circumferential surface of the choke coil 34, as shown in FIG. 15(d). That is, properties of the circuit breaker 35 are designed to be optimized without changing specifications thereof by changing the heat-receiving surface area of the extended portion 48b depending on the kind of motor, in turn, the ambient temperature of the circuit breaker 35.

Therefore, the circuit breaker 35 can be used in common irrespective of the kind of motor, contributing to cost reduction. Further, since the extended portion 48b is designed to receive heat from the choke coil and to transfer the heat to the circuit breaker 35, there is no need of using an expensive circuit breaker having high heat sensitivity.

The constitution of the motor section 2 and that of the decelerating section 3 may suitably be modified.

While the above embodiments are carried out in the wiper motor 1 of an in-vehicle wiper apparatus, it may be carried out in motors for other in-vehicle apparatuses. In addition, the above embodiments may be carried out in motors for apparatuses other than in-vehicle apparatuses.

The present examples and embodiments are to be considered as illustrative and not restrictive and the invention is not to be limited to the details given herein, but may be modified within the scope and equivalence of the appended claims.

What is claimed is:

1. A motor comprising:
   a motor housing;
   an armature having a rotating shaft and a commutator, the armature being rotatably supported in the motor housing;
   brushes brought into friction contact with the commutator;
   brush holders for holding the brushes respectively;
   a base plate to which the brush holders are attached; the base plate having a first side and a second side, the second side being opposite to the first side; and
   a plurality of electric parts to be mounted on the base plate; the electric parts being allocated to the first side and the second side of the base plate.

2. The motor according to claim 1, wherein the plurality of electric parts have longitudinal axes respectively and are arranged such that these axes are parallel to the axis of the rotating shaft.

3. The motor according to claim 1, wherein at least one of the electric parts arranged on the first side of the base plate is oriented such that the longitudinal axis thereof is parallel to the axis of the rotating shaft, whereas at least one of the electric parts arranged on the second side of the base plate is oriented such that the longitudinal axis thereof is parallel to the base plate.

4. The motor according to claim 1, wherein the base plate is fixed to the motor housing on the central line thereof intersecting perpendicularly to the axis of the rotating shaft, the electric parts being arranged to form symmetry with respect to the central line.

5. The motor according to claim 1, wherein the electric parts include choke coils and a circuit breaker.

6. The motor according to claim 5, wherein the circuit breaker has a terminal plate for securing electrical connection, the terminal plate being located adjacent to one of the choke coils and having a heat receiving portion for receiving heat generated in the choke coil.

7. A motor comprising:
a motor housing;
an armature having a rotating shaft and a commutator, the armature being rotatably supported in the motor housing;
brushes brought into friction contact with the commutator;
brush holders for holding the brushes respectively;
a base plate to which the brush holders are attached;
a plurality of electric parts to be mounted on the base plate, the electric parts having longitudinal axes respectively; and
a plurality of part holders for holding the electric parts respectively, the part holders being attached to the base plate with the electric parts being positioned such that the longitudinal axes thereof extend parallel to the axis of the rotating shaft.

8. The motor according to claim 7, wherein the part holders are removably attached to the base plate.

9. The motor according to claim 7, wherein the base plate is fixed to the motor housing on the central line thereof intersecting perpendicularly to the axis of the rotating shaft, the electric parts being arranged to form substantially symmetry with respect to the central line of the base plate.

10. The motor according to claim 9, wherein the plurality of part holders comprise a first part holder and a second part holder.

11. The motor according to claim 10, wherein the electric parts comprise three choke coils and a single circuit breaker, the first part holder holding two of the three choke coils, whereas the second part holder holding one of the three choke coils and the single circuit breaker.

12. The motor according to claim 10, wherein the base plate has a first side and a second side, the first part holder and the second part holder being located on the first side and on the second side of the base plate, respectively.

13. The motor according to claim 7, wherein each part holder has a holding piece for holding a joint of the electric part held in the holder.

14. The motor according to claim 7, wherein the motor housing comprises a yoke housing and a gear housing, the yoke housing supporting rotatably the armature, whereas the gear housing containing a decelerating mechanism for decelerating revolution of the rotating shaft and outputting the decelerated revolution.

15. A motor comprising:
a motor housing containing a yoke housing and a gear housing;
an armature having a rotating shaft and a commutator, the armature being rotatably supported in the yoke housing;
a decelerating mechanism for decelerating revolution of the rotating shaft and outputting the decelerated revolution, the mechanism being located in the gear housing;
a base plate interposed between the yoke housing and the gear housing;
brushes brought into friction contact with the commutator;
brush holders for holding the brushes respectively, which are attached to the base plate; and
a plurality of electric parts to be mounted on the base plate;
the gear housing having a mounting portion for mounting the motor to other apparatuses and a receiving portion for receiving at least a part of the electric part, the receiving portion being located between the rotating shaft and the mounting portion.

16. The motor according to claim 15, wherein the receiving portion is located within the profile of the yoke housing.

17. The motor according to claim 15, wherein the decelerating mechanism has an output shaft extended orthogonal to the rotating shaft; the receiving portion being located between the output shaft and the yoke housing along the axis of the rotating shaft.

18. A motor comprising:
a motor housing;
an armature having a rotating shaft and a commutator, the armature being rotatably supported in the motor housing;
brushes brought into friction contact with the commutator;
brush holders for holding the brushes respectively;
a base plate to which the brush holders are attached; the base plate having a first side and a second side; and
a plurality of electric parts to be mounted on the base plate, the electric parts being allocated to the first side and the second side of the base plate, at least one of the electric parts allocated to the first side and at least one of the electric parts allocated to the second side extend in opposite directions with respect to each other.

19. The motor according to claim 18, further comprising a first part holder and a second part holder, the first part holder holding at least one of the electric parts allocated to the first side, whereas the second part holder holding at least one of the electric parts allocated to the second side.

20. The motor according to claim 19, wherein the electric parts held by the first part holder comprise a pair of choke coils, whereas the electric parts held by the second part holder comprise a choke coil and a circuit breaker.

21. The motor according to claim 18, wherein the electric parts have axes extending parallel to the axis of the rotating shaft, respectively.

22. The motor according to claim 19, wherein each part holder is provided with a holding piece for holding a joint of the electric part held in the holder.

* * * * *